Oct. 13, 1959 R. R. ROUGH 2,908,738
ELECTRODE FOR A GLASS MELTING FURNACE
Filed Dec. 21, 1956
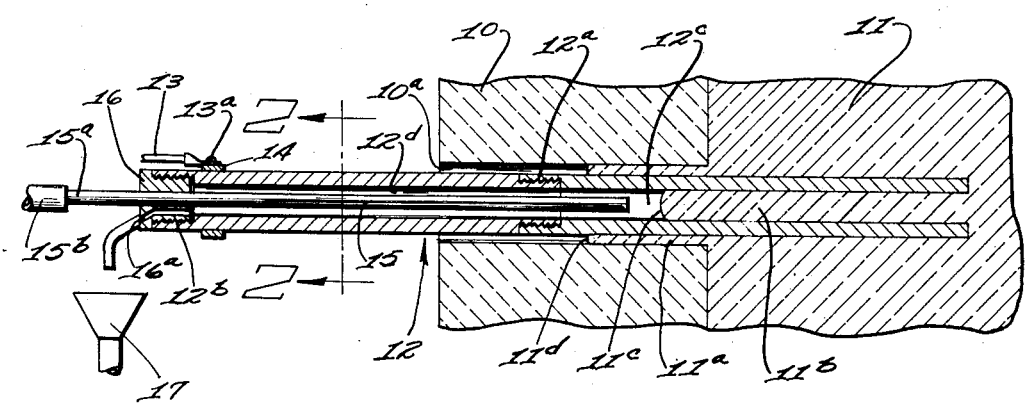
Fig. 1
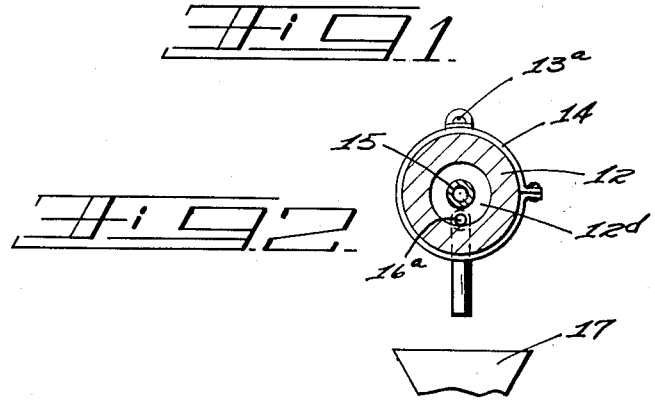
Fig. 2
Fig. 3
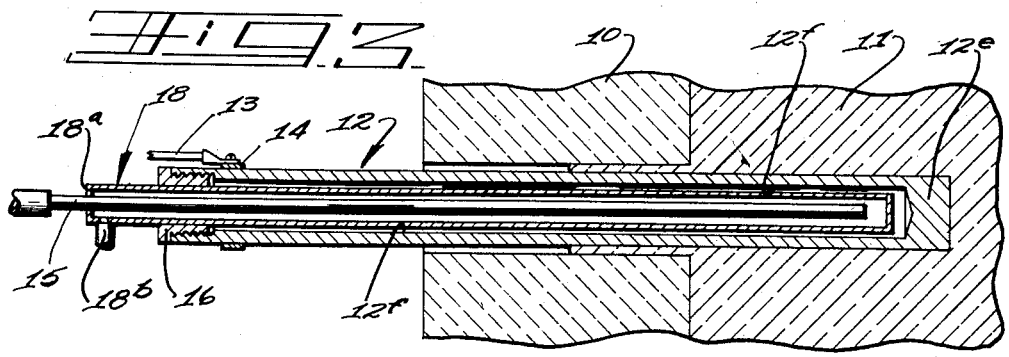
INVENTOR
ROBERT R. ROUGH
BY W. A. SCHAICH &
LEONARD D. SOUBIER
ATTORNEYS United States Patent Office 2,908,738
Patented Oct. 13, 1959

2,908,738

ELECTRODE FOR A GLASS MELTING FURNACE

Robert R. Rough, Toledo, Ohio, assignor to Owens-Illinois Glass Company, a corporation of Ohio Application December 21, 1956, Serial No. 629,965

5 Claims. (Cl. 13—17)

This invention relates to an improved electrode construction suitable for use in the electric melting of vitrescent materials.

Heretofore, it has been found that conventional combustion type glass melting furnaces oftentimes may be operated with a substantially increased heating efficiency and with an improved glass melting rate by either supplementing or entirely replacing combustion type heating methods with electric melting techniques. Basically, these electric melting techniques employ resistance or Joule effect heating principles to melt the glass-forming or vitrescent materials, as by the introduction of an electric current into the vitrescent materials which have been previously reduced to at least a heat-softened or semi-molten condition.

In transmitting an electric current to the heat-softened or semi-molten vitrescent materials, it has been customary to immerse electrodes fabricated from such materials as carbon, tungsten, or molybdenum within the molten material. However, due to the extreme temperatures emanating from the interior of the glass melting furnace, such electrodes tend to readily oxidize and decompose unless isolated from ambient air. For example, molybdenum oxide, which forms on a molybdenum electrode during use, constitutes a protective coating against further continued oxidation of the molybdenum up to a temperature of approximately 575° C., but at temperatures of approximately 575° C. to 625° C. and above, the molybdenum oxide coating begins to decompose and thereafter a process of continuous oxidation and decomposition of the molybdenum takes place.

To alleviate the harmful deterioration and decomposition of such electrodes, various types of oxidation shields, cooling jackets, and other elaborate and expensive protective devices have been employed. Heretofore, however, it seems that these protective structures have been primarily designed in accordance with the objective of enclosing or surrounding the exterior surface of the electrode. As a result, there is occasioned by such types of protective devices a substantial increase in the overall size and weight of the electrode assembly and, consequently, an increase in the time and labor involved in maintaining and replacing an electrode protected in such manner. Additionally, the utilization of cooling jackets surrounding the electrode, in many instances, substantially increases the heat losses from the molten material, particularly around the electrode and, consequently, the thermal efficiency of the electrode is reduced significantly. This increased heat loss is to be expected, however, since these cooling jackets, in addition to cooling the exterior surface of the electrodes, also withdraw considerable heat from the molten material itself.

The present invention is adapted to overcome many of the disadvantages which have arisen through the utilization of electrode assemblies employing cooling jackets, oxidation shields, and the like, which surround or enclose the electrode.

Accordingly, it is an object of this invention to provide an improved electrode construction for thermally oxidizable electrodes, such as may be used in melting vitrescent materials, which will eliminate the necessity of employing protective devices surrounding or encasing the electrode, and which, at the same time, will provide protection for the electrode against excessive decomposition due to thermal oxidation.

Another object of the present invention is to provide an improved electrode assembly for melting vitrescent materials which is characterized by lighter weight and a reduced size and which, when assembled, may be introduced into the furnace through a smaller furnace opening than electrode assemblies heretofore utilized.

A particular object of the present invention is the provision of a thermally oxidizable electrode for electrically melting vitrescent materials, which is adapted to be internally cooled to prevent excessive electrode deterioration due to thermal oxidation and decomposition.

Other objects and advantages of the present invention will become apparent to those skilled in the art from the following detailed description taken in conjunction with the annexed sheet of drawings on which, by way of example only, two preferred embodiments of this invention are illustrated.

With reference to the drawings:

Fig. 1 is a centrally sectioned elevational view of an electrode constructed in accordance with this invention, said electrode being illustrated in its operative position extending through a furnace wall into a body of molten vitrescent material.

Fig. 2 is a sectional view taken substantially along the section-line 2—2 in Fig. 1.

Fig. 3 is a view similar to Fig. 1, but illustrating a modified form of the present invention.

Referring to Fig. 1, there is schematically represented a portion of a furnace wall 10, such as forms the wall portion of a conventional glass melting furnace. Contacting the interior surface of the furnace wall, there is a mass of molten vitrescent material 11, composed of various batch materials suitable for producing a glass having the desired physical and chemical properties. Extending through the wall 10, there is an aperture 10a which communicates with the molten material 11, preferably at a location well below the surface level normally occupied by the molten material under ordinary furnace operating conditions.

As illustrated in Figs. 1 and 2, there is positioned within the aperture 10a, a tubular electrode 12 which extends into the molten material 11 and supplies electric current thereto for Joule-effect heating purposes. The electrode 12 is preferably fabricated from molybdenum, although it is understood that such materials as graphite, tungsten, or other similar materials, which, in addition to exhibiting the requisite electrically conductive properties, do not materially affect the composition or color of the resultant glass, are also suitable. Since electrode materials such as those described have a tendency to undergo gradual erosion when placed within the molten material 11, it has been found expedient to construct such electrodes in sections, which may be secured together in endwise relationship by complementary threads formed on the opposite ends of each section, as at 12a. In this manner, the electrode may be intermittently fed into the molten material a distance sufficient to replace that portion of the electrode which has become eroded and consumed during the melting operations.

The electrode 12 is electrically energized by an electric cable 13, which transmits electrical current from a suitable electrical supply to the electrode. The cable 13 is connected to the electrode through a collar 14, which is clamped about the periphery of the electrode and bolted to the end of the cable by means of bolt 13a.

Closing off the outer end 12b of the electrode 12, there is a bushing 16, which is constructed to be threaded into the internal threads provided on the end of the electrode. As illustrated, the threads provided on the end 12b of the electrode for the attachment of an additional electrode section are suitable for this purpose. Slidably journalled through the bushing 16, there is an elongated conduit 15 which extends coaxially into the hollow central portion, or cooling chamber 12c, of the electrode. This conduit is connected at its outer end 15a through a flexible coupling 15b to a suitable coolant supply. In such position, the conduit 15, which is substantially smaller than the cooling chamber 12c, cooperates with the interior surface of the electrode to define an annular coolant passage 12d, which communicates with a discharge outlet 16a, extending through the bushing 16 to permit coolant, after being circulated through the cooling chamber and coolant passage, to be discharged into a drain 17, located beneath the discharge outlet. Optionally, the discharge outlet 16a may be positioned at a location 180° removed from that illustrated, particularly when only a relatively small flow of coolant through the cooling chamber is desired. In this rotated position of the discharge outlet, the cooling chamber may be maintained substantially filled with coolant regardless of the rate of flow.

By providing a furnace wall aperture 10a, which is somewhat larger in diameter than the electrode 12, the electrode, when placed in its operative position, as illustrated in Fig. 1, may be securely mounted simply by permitting a quantity of the molten material 11, such as material 11a, to flow into the aperture between the furnace wall 10 and the electrode 12 and increase in viscosity or solidify as a result of cooling and thereby hold the electrode in assembled position. This mounting procedure has been found to be effective both with and without the use of additional mounting brackets. This material 11a which mounts the electrode additionally affords considerable protection to the electrode by isolating a considerable portion of the electrode from the ambient atmosphere and, consequently, from deterioration occasioned by oxidation. The extent to which the material 11a is permitted to flow into the aperture 10a before reaching a non-flowable or solidified condition, normally may be controlled by the proper regulation of coolant being supplied to the cooling chamber 12c by the conduit 15.

The interior of the tubular electrode 12, which is hollow and forms the cooling chamber 12c, likewise will begin to fill with molten material such as 11b when the electrode is placed in its operative position. By permitting a substantial quantity of this molten material 11b to flow into the electrode, a highly desirable reduction in heat loss from the main body of molten material 11 within the furnace can be accomplished, particularly if the molten material 11b is permitted to flow into the electrode a sufficient amount to close off the cooling chamber 12c at a location within the confines of the furnace wall 10, as indicated generally in Fig. 1 by the barrier formed at 11c.

However, in permitting the molten material 11b to flow into the electrode for the purpose described above, it is important to also insure that the cooling chamber 12c is permitted to carry coolant to a location in the proximity of the interface between the atmosphere and the material 11a, such at at 11d, since it is at this location that the electrode is ordinarily exposed to the most severe conditions for promoting thermal decomposition. Hence, although it is desirable to permit the material 11b to flow to a position within the electrode located well within the confines of the furnace wall, the extent of such flow should be restricted to a position which will permit the cooling chamber 12c to carry coolant to a location within the electrode at least directly opposite the interface 11d. The relative locations of the interface 11d and the restriction 11c, when located substantially as illustrated, have been found to be particularly favorable in this respect.

In the modification respresented by Fig. 3, the electrode 12 is formed with a closed inner end portion 12e, and represents a type of electrode which may be cooled internally throughout substantially its entire length. In situations in which furnace melting conditions require that relatively extreme melting temperatures be employed, such as would tend to produce excessive erosion of an electrode constructed from materials such as molybdenum, it has been found desirable to cool the immersed portion of the electrode as well as the portion which is subject to thermal oxidation. As an example it is well known in the art that the erosion and chemical attack which a molybdenum electrode undergoes when immersed in molten glass progresses at a relatively slow rate so long as the molybdenum is maintained at a temperature below about 2400° F. On the other hand, when the same type of electrode is permitted to attain a temperature of 2700° F., the erosion and chemical attack proceeds quite rapidly. Thus, in the modification illustrated, there is provided an electrode construction which is capable of being employed in melting furnaces operating under such extreme conditions. However, an additional consideration in determining the temperature at which the electrode and, consequently, the molybdenum should be permitted to operate is the attendant effect upon the thermal efficiently of the furnace. Obviously, the lower the temperature at which the electrode is operated, the greater will be the amount of heat withdrawn from the molten glass by the coolant. Hence, the most desirable condition is one which will adequately protect the electrode from excessive erosion and chemical attack and, at the same time, maintain the amount of heat withdrawn from the molten material at a minimum. Obviously then, the most feasible operating temperature is one which is just below that at which excessive erosion and chemical attack of the molybdenum begins to transpire, e.g., a temperature of about 2400° F. The present invention permits such a temperature condition to be easily and economically maintained by merely circulating a coolant such as water through the interior of the electrode.

As illustrated, the modified electrode construction may also be provided with a sleeve 18 which surrounds the conduit 15 and is concentrically spaced intermediate the conduit and the interior surface 12f of the electrode 12, the conduit 15 being journalled through the outer end 18a of the sleeve, and the sleeve, in turn, being journalled through the bushing 16 and provided with a coolant discharge outlet 18b located exteriorially of the electrode. Sleeve 18 is closed to the interior surface of the electrode and spaced therefrom in order to increase thermal efficiency by eliminating direct heat conduction from the molten material 11 through the electrode to the coolant. For example, if the coolant were permitted to directly contact the interior surface of the electrode, as in the case of a coolant such as water, the highest temperature which the interior surface could attain without the necessity of utilizing a pressurized jacket would be the vaporization temperature of the water, viz., about 212° F. Consequently, the immersed portion of the electrode would ordinarily be cooled to a much greater extent than necessary to achieve adequate protection from erosion and chemical attack and, consequently, the heat loss from the molten material would be exceedingly high. However, by utilizing a sleeve 18 properly spaced from the interior surface of the electrode, the interior surface of the electrode can attain a temperature considerably in excess of the vaporization temperature of the coolant. In fact, the temperature of the interior surface of the electrode may be permitted to attain a temperature of about 2000° F. by properly insulating the sleeve 18. Furthermore, by suitably insulating the sleeve, the coolant, even if it be water, need not be raised above its vaporization temperature in order to achieve this desirable result. However, it is also contemplated that it may be desirable in certain circumstances to withdraw the sleeve 18 from the electrode and permit the coolant to directly contact the interior surface 12f of the electrode, particularly in situations where reasons for prolonging the life of the electrode may outweigh the resulting decreased thermal efficiency.

Regardless of which of the aforedescribed electrode constructions are utilized, however, there is presented an improved construction which permits the electrode to be effectively protected from excessive thermal oxidation and decomposition without the necessity of employing expensive and burdensome cooling jackets, oxidation shields, and the like, surrounding or encasing the electrode.

Another advantage of an electrode construction having a cooling chamber formed internally of the electrode itself resides in the fact that although the amount of material such as molybdenum from which the electrode is fabricated is substantially reduced, the electrical heating effectiveness remains practically the same as would be obtained from an electrode of solid construction, assuming identical diametrical dimensions. This result is apparent from the fact that the relatively high resistance to current flow which obtains in the molten vitrescent material is the principal controlling factor in determining the amount of current which may be passed through the electrode, and since the area of contact between the electrode and the molten material remains substantially the same regardless of whether the electrode is solid or tubular, the total electric current passing into the molten material is substantially the same, or increased. Hence, there is no loss in heating effectiveness as a result of the tubular construction of the hollow type electrode as compared to a solid construction, yet there is considerably less molybdenum utilized, and the weight of the electrode is substantially reduced.

It will, of course, be understood that various details of construction may be modified throughout a wide range without departing from the principles of this invention, and it is, therefore, not intended to limit the patent granted hereon otherwise than necessitated by the scope of the appended claims.

I claim:

1. An electrode for electrically heating molten materials having vitrescent properties, said electrode comprising a hollow body portion having at least one end thereof open, said body portion being electrically conductive and said open end being immersible in said molten material and defining thereby an interior cooling chamber, and means for circulating a coolant within said cooling chamber when said electrode is immersed in said molten materials.

2. A thermally oxidizable electrode for electrically heating molten materials having vitrescent properties, said electrode comprising an elongated hollow body portion terminating in an open end portion immersible in said molten materials, said body portion defining an interior cooling chamber extending axially along the length of said electrode and communicating with said open end portion an inlet opening and an outlet opening communicating with said cooling chamber at a location spaced from said immersible end portion, means for passing a coolant through said inlet and outlet openings and through said cooling chamber.

3. A thermally oxidizable electrode for electrically heating molten materials having glass forming properties, said electrode comprising a tubular body portion defining an elongated cooling chamber, said body portion having at least one end thereof open and immersible in said glass forming materials to permit an amount of said glass forming materials to flow axially into said electrode, and means for circulating a coolant within said cooling chamber in contact with said glass forming material, said coolant thereby lowering the viscosity of said vitrescent materials to a non-flowable condition to seal the open immersible end of said electrode.

4. A thermally oxidizable electrode for electrically heating molten materials having glass forming properties, said electrode comprising a tubular electrically conductive body portion defining an elongated cooling chamber extending lengthwise of said electrode, said body portion having an inner end portion defining an opening therein communicating with said chamber, said inner end portion being immersible in said molten materials and said molten materials serving to seal said opening, an elongated conduit coaxially traversing said cooling chamber in concentrically spaced relationship, said conduit terminating in an open end portion proximately spaced from said immersible end portion, said electrode defining a discharge orifice communicating with said chamber at a location substantially spaced from said immersible end portion, means for circulating a coolant through said conduit, said chamber, and said discharge orifice.

5. An electrode for electrically heating molten materials having vitrescent properties, said electrode comprising a hollow cylindrical body portion having an open end immersible in said molten materials, and means for passing a coolant into said hollow portion of said electrode.

References Cited in the file of this patent

UNITED STATES PATENTS

| | | |
|---|---|---|
| 858,400 | Von Kugelgen et al. | Jan. 31, 1905 |
| 2,693,498 | Penberthy | Nov. 2, 1954 |